United States Patent
Amidi et al.

(10) Patent No.: US 9,921,762 B2
(45) Date of Patent: Mar. 20, 2018

(54) REDUNDANT BACKUP USING NON-VOLATILE MEMORY

(71) Applicant: Netlist, Inc., Irvine, CA (US)

(72) Inventors: Mike Hossein Amidi, Lake Forest, CA (US); Chi-She Chen, Walnut, CA (US); Jeffrey C. Solomon, Irvine, CA (US); Scott H. Milton, Irvine, CA (US); Jayesh Bhakta, Cerritos, CA (US)

(73) Assignee: Netlist, Inc., Irvine, CA (US)

( * ) Notice: Subject to any disclaimer, the term of this patent is extended or adjusted under 35 U.S.C. 154(b) by 0 days.

(21) Appl. No.: 14/489,281

(22) Filed: Sep. 17, 2014

(65) Prior Publication Data

US 2015/0248249 A1 Sep. 3, 2015

Related U.S. Application Data

(63) Continuation of application No. 13/625,563, filed on Sep. 24, 2012, now Pat. No. 8,904,098, which is a continuation-in-part of application No. 12/240,916, filed on Sep. 29, 2008, now Pat. No. 8,301,833, which is a continuation of application No. 12/131,873, filed on Jun. 2, 2008, now abandoned.

(Continued)

(51) Int. Cl.
| | |
|---|---|
| *G06F 3/00* | (2006.01) |
| *G06F 3/06* | (2006.01) |
| *G06F 11/14* | (2006.01) |
| *G06F 11/16* | (2006.01) |

(52) U.S. Cl.
CPC .......... *G06F 3/0619* (2013.01); *G06F 3/065* (2013.01); *G06F 3/0655* (2013.01); *G06F 3/0688* (2013.01); *G06F 11/1441* (2013.01); *G06F 11/1612* (2013.01); *G06F 2212/7208* (2013.01)

(58) Field of Classification Search
None
See application file for complete search history.

(56) References Cited

U.S. PATENT DOCUMENTS

| | | |
|---|---|---|
| 2,043,099 A | 2/1936 | Hanna |
| 3,562,555 A | 2/1971 | Ahrons |

(Continued)

FOREIGN PATENT DOCUMENTS

| | | |
|---|---|---|
| EP | 2737383 A2 | 6/2014 |
| WO | 2013016723 A3 | 1/2013 |

OTHER PUBLICATIONS

Office Action in U.S. Appl. No. 12/240,916, dated Jul. 29, 2011.

(Continued)

*Primary Examiner* — Midys Rojas
(74) *Attorney, Agent, or Firm* — Shami Messinger PLLC

(57) ABSTRACT

Data stored in a volatile memory subsystem is backed up redundantly into first and second channels of a non-volatile memory subsystem. The data is retrieved from the volatile memory subsystem upon detection of a trigger condition indicative of real or imminent power loss or reduction and multiple copies are stored in dedicated non-volatile memory channels. The stored copies may be error checked and corrected, and re-written if necessary. The redundantly backed up data can be subsequently retrieved from the non-volatile memory subsystem, error-corrected, and an error-free copy communicated to the volatile memory subsystem.

22 Claims, 9 Drawing Sheets

Related U.S. Application Data

(60) Provisional application No. 61/538,775, filed on Sep. 23, 2011, provisional application No. 60/941,586, filed on Jun. 1, 2007.

(56) References Cited

U.S. PATENT DOCUMENTS

| | | |
|---|---|---|
| 3,916,390 A | 10/1975 | Chang et al. |
| 4,234,920 A | 11/1980 | Van Ness et al. |
| 4,420,821 A | 12/1983 | Hoffman |
| 4,449,205 A | 5/1984 | Hoffman |
| 4,882,709 A | 11/1989 | Wyland |
| 4,965,828 A | 10/1990 | Ergott, Jr. et al. |
| 7,600,142 B2 | 10/1990 | Groos |
| 5,430,742 A | 7/1995 | Jeddeloh et al. |
| 5,490,155 A | 2/1996 | Abdoo et al. |
| 5,519,663 A | 5/1996 | Harper, Jr. et al. |
| 5,519,831 A | 5/1996 | Holzhammer |
| 5,563,839 A | 10/1996 | Herdt et al. |
| 5,577,213 A | 11/1996 | Avery et al. |
| 5,619,644 A | 4/1997 | Crockett et al. |
| 5,675,725 A | 10/1997 | Malcolm |
| 5,799,200 A * | 8/1998 | Brant .............. G06F 11/1441 365/229 |
| 5,813,029 A | 9/1998 | Klein |
| 5,870,350 A | 2/1999 | Bertin et al. |
| 5,874,995 A | 2/1999 | Naimpally et al. |
| 5,890,192 A | 3/1999 | Lee et al. |
| 5,953,215 A | 9/1999 | Karabatsos |
| 5,991,885 A | 11/1999 | Chang et al. |
| 6,023,421 A | 2/2000 | Clinton et al. |
| 6,026,465 A | 2/2000 | Mills et al. |
| 6,065,092 A | 5/2000 | Roy |
| 6,112,310 A | 8/2000 | Jun et al. |
| 6,145,068 A | 11/2000 | Lewis |
| 6,158,015 A | 12/2000 | Klein |
| 6,199,142 B1 | 3/2001 | Saulsbury et al. |
| 6,216,247 B1 | 4/2001 | Creta et al. |
| 6,269,382 B1 | 7/2001 | Cabrera et al. |
| 6,336,174 B1 | 1/2002 | Li et al. |
| 6,336,176 B1 | 1/2002 | Leyda et al. |
| 6,421,279 B1 | 7/2002 | Tobita et al. |
| 6,459,647 B1 | 10/2002 | Kengeri |
| 6,487,102 B1 | 11/2002 | Halbert et al. |
| 6,487,623 B1 | 11/2002 | Emerson et al. |
| 6,571,244 B1 | 5/2003 | Larson |
| 6,614,685 B2 | 9/2003 | Wong |
| 6,658,507 B1 | 12/2003 | Chan |
| 6,691,209 B1 | 2/2004 | O'Connell |
| 6,693,840 B2 | 2/2004 | Shimada et al. |
| 6,721,860 B2 | 2/2004 | Klein |
| 6,769,081 B1 | 7/2004 | Parulkar |
| 6,799,241 B2 | 9/2004 | Kahn et al. |
| 6,799,244 B2 | 9/2004 | Tanaka et al. |
| 6,810,513 B1 | 10/2004 | Vest |
| 6,816,982 B2 | 11/2004 | Ravid |
| 6,944,042 B2 | 9/2005 | Komatsuzaki |
| 6,948,029 B2 | 9/2005 | Yano |
| 6,952,368 B2 | 10/2005 | Miura et al. |
| 7,053,470 B1 | 5/2006 | Sellers et al. |
| 7,062,618 B2 | 6/2006 | Tsunoda et al. |
| 7,089,412 B2 | 8/2006 | Chen |
| 7,102,391 B1 | 9/2006 | Sun et al. |
| 7,111,142 B2 | 9/2006 | Spencer et al. |
| 7,136,978 B2 | 11/2006 | Miura et al. |
| 7,155,627 B2 | 12/2006 | Matsui |
| 7,200,021 B2 | 4/2007 | Raghuram |
| 7,234,099 B2 | 6/2007 | Gower et al. |
| 7,353,325 B2 | 4/2008 | Lofgren et al. |
| 7,409,590 B2 | 8/2008 | Moshayedi et al. |
| 7,411,859 B2 | 8/2008 | Sohn et al. |
| 7,421,552 B2 | 9/2008 | Long |
| 7,409,491 B2 | 12/2008 | Doblar et al. |
| 7,467,251 B2 | 12/2008 | Park et al. |
| 7,519,754 B2 | 4/2009 | Wang et al. |
| 7,716,411 B2 | 5/2010 | Panabaker et al. |
| 7,818,488 B2 | 10/2010 | Park et al. |
| 7,873,750 B2 | 1/2011 | Yabuta et al. |
| 8,086,955 B2 | 12/2011 | Zhou et al. |
| 8,102,614 B2 | 1/2012 | Song et al. |
| 8,233,303 B2 | 7/2012 | Best et al. |
| 8,301,833 B1 | 10/2012 | Chen et al. |
| 8,407,395 B2 | 3/2013 | Kim et al. |
| 8,412,879 B2 | 4/2013 | Chang et al. |
| 8,516,187 B2 | 8/2013 | Chen et al. |
| 8,671,243 B2 | 3/2014 | Chen et al. |
| 8,677,060 B2 | 3/2014 | Chen et al. |
| 8,874,831 B2 | 10/2014 | Lee et al. |
| 8,880,791 B2 | 11/2014 | Chen et al. |
| 8,904,098 B2 | 12/2014 | Amidi et al. |
| 8,904,099 B2 | 12/2014 | Chen et al. |
| 9,043,677 B2 | 5/2015 | Kong et al. |
| 9,158,684 B2 | 10/2015 | Lee et al. |
| 9,361,250 B2 | 6/2016 | Shan et al. |
| 9,436,600 B2 | 9/2016 | Lee |
| 2002/0053944 A1 | 5/2002 | Brass et al. |
| 2002/0083368 A1 | 6/2002 | Abe et al. |
| 2002/0199061 A1 | 12/2002 | Friedman et al. |
| 2003/0028733 A1 | 2/2003 | Tsunoda et al. |
| 2003/0158995 A1 | 8/2003 | Lee et al. |
| 2004/0088508 A1 | 5/2004 | Ballard et al. |
| 2004/0163027 A1 | 8/2004 | MacLaren et al. |
| 2004/0190210 A1 | 9/2004 | Leete |
| 2005/0044302 A1 | 2/2005 | Pauley et al. |
| 2005/0060488 A1 | 3/2005 | Poechmueller |
| 2005/0132250 A1 | 6/2005 | Hansen et al. |
| 2005/0141273 A1 | 6/2005 | Park et al. |
| 2005/0249011 A1 | 11/2005 | Maeda |
| 2005/0273548 A1 | 12/2005 | Roohparvar |
| 2006/0039197 A1 | 2/2006 | Khouri et al. |
| 2006/0069896 A1 | 3/2006 | Sanders |
| 2006/0080515 A1 | 4/2006 | Spiers et al. |
| 2006/0212651 A1 | 9/2006 | Ashmore |
| 2006/0294295 A1 | 12/2006 | Fukuzo |
| 2007/0070669 A1 | 3/2007 | Tsern |
| 2007/0136523 A1 | 6/2007 | Bonella et al. |
| 2007/0147115 A1 | 6/2007 | Lin et al. |
| 2007/0192627 A1 | 8/2007 | Oshikiri |
| 2007/0255898 A1 | 11/2007 | Nishide et al. |
| 2007/0288683 A1 | 12/2007 | Panabaker et al. |
| 2008/0104344 A1 | 5/2008 | Shimozono et al. |
| 2008/0147968 A1 | 6/2008 | Lee et al. |
| 2008/0195806 A1 | 8/2008 | Cope |
| 2008/0235443 A1 | 9/2008 | Chow et al. |
| 2008/0291727 A1 | 11/2008 | Seo et al. |
| 2009/0031099 A1 | 1/2009 | Sartore |
| 2010/0110748 A1 | 5/2010 | Best |
| 2010/0274953 A1 | 10/2010 | Lee et al. |
| 2010/0322020 A1 | 12/2010 | Kim |
| 2011/0078496 A1 | 3/2011 | Jeddeloh |
| 2011/0161569 A1 | 6/2011 | Shan et al. |
| 2011/0320804 A1 | 12/2011 | Chan et al. |
| 2012/0117402 A1 | 5/2012 | Machnicki et al. |
| 2012/0204079 A1 | 8/2012 | Takefman et al. |
| 2012/0265952 A1 | 10/2012 | Kurita |
| 2012/0271990 A1 | 10/2012 | Chen et al. |
| 2012/0317433 A1 | 12/2012 | Ellis et al. |
| 2013/0019076 A1 | 1/2013 | Amidi et al. |
| 2013/0086309 A1 | 4/2013 | Lee et al. |
| 2013/0254456 A1 | 9/2013 | Chen et al. |
| 2013/0254497 A1 | 9/2013 | Chen et al. |
| 2014/0032820 A1 | 1/2014 | Harasawa et al. |
| 2014/0059170 A1 | 2/2014 | Gasparakis et al. |
| 2014/0156919 A1 | 6/2014 | Chen et al. |
| 2014/0156920 A1 | 6/2014 | Chen et al. |
| 2015/0058701 A1 | 2/2015 | Xing et al. |

OTHER PUBLICATIONS

Office Action in U.S. Appl. No. 12/240,916, dated Feb. 1, 2012.
Advisory Action in U.S. Appl. No. 12/240,916, dated Mar. 13, 2012.
Office Action in U.S. Appl. No. 12/240,916, dated Apr. 3, 2012.
Office Action in U.S. Appl. No. 13/536,173, dated Apr. 15, 2013.

(56) References Cited

OTHER PUBLICATIONS

Office Action in U.S. Appl. No. 13/905,048, dated Aug. 1, 2013.
Notice of Allowance in U.S. Appl. No. 13/559,476, dated May 6, 2014.
International Search Report and Written Opinion in PCT/US12/48750, dated Oct. 10, 2012.
International Preliminary Report on Patentability in PCT/US12/48750, dated Apr. 3, 2014.
Office Action in U.S. Appl. No. 13/625,563, dated Aug. 5, 2013.
Office Action in U.S. Appl. No. 13/625,563, dated May 9, 2014.
Office Action in U.S. Appl. No. 13/905,053, dated Aug. 1, 2013.
Office Action in U.S. Appl. No. 14/173,219, dated Mar. 13, 2014.
Office Action in U.S. Appl. No. 14/173,242, dated Mar. 14, 2014.
JEDEC Standard 21-C, "Configurations for Solid State Memories," pp. 4.5.5-1 to 4.5.5-18.
Diablo Technologies, Inc.'s Invalidity Contentions, Case No. 13-CV-05889 YGR, dated Jun. 6, 2014.
Smart Storage Systems, Inc's Invalidity Contentions, Case No. 4:13-cv-05889-YGR, dated Jun. 6, 2014.
JEDEC Standard, "Configurations for Solid State Memories", JEDEC Standard 21-C, Release 9, Aug. 1999, 114 pages.
Wong, A. "The BIOS Optimization Guide", Adrian's Rojak Pot, Rev. 6.2, 1998-2001, 67 pages.
American National Standard Dictionary of Electrical and Electrical Terms, IEEE, Fourth Edition, Revised, ANS/IEEE Std 100-1988, Institute of Electrical Engineers, Nov. 3, 1988, pp. 215, 722, 964 and 1103.
Webster's II New College Dictionary, Houghton Mifflin Company, Boston, MA, 2001, pp. 259, 1115.
Bruce, J., "Synchronous DRAM Architectures, Organizations, and Alternate Technologies", Electrical and Computer Engineering Dept., Univ. of Maryland, Dec. 10, 2002, 22 pages.
David, H. et al., "Fully Buffered DIMM (FB-DIMM) Design Considerations", Intel Developer Forum, Intel Corp., Feb. 18, 2004, 36 pages.
Horowitz, P. et al., "The Art of Electronics", Cambridge University Press 2nd Ed. 1989, pp. 471, 495-496.
Innis, J., "MPC8560 PowerQUICC III Compact Flash Interface Design", Freescale Semiconductor, Inc., 2004-2006, pp. 1-23.
Jacob, B., "Memory Systems Cache, DRAM, Disk", Morgan Kaufman Publishers, Burlington, MA, 2008, Preface and Ch. 7 pp. 315-322.
Jandhyala, S. et al., "Design-For-Test Analysis of a Buffered SDRAM DIMM", Semiconductor Group, Texas Instruments, Proceedings of International Workshop in Memory Technology, Design and Testing, Singapore, Aug. 13014, 1996, 15 pages.
JEDEC Standard, Double Data Rate (DDR): SDRAM Specification: JESD79C (Revision JESD79B), Mar. 2003, pp. 1-75.
JEDEC Standard, FBDIMM Specification: DDR2 SDRAM Fully Buffered DIMM (FBDIMM) Design Specification: JESD205, JEDEC Solid State Tech. Assoc., Mar. 2007, pp. 1-129.
Mutnuary, B. et al., "Analysis of Fully Buffered DIMM Interface in High-speed Server Applications", IBM Corp, xSeries eServer Development, 2006 Electronic Components and Technology Conference, pp. 203-208.
Petition for Inter Partes Review of U.S. Pat. No. 8,516,187 (on behalf of SanDisk, Corp.), filed Jun. 19, 2014.
Petition for Inter Partes Review of U.S. Pat. No. 8,301,833 (on behalf of SanDisk, Corp.), filed Jun. 20, 2014.
"Using Two Chip Selects to Enable Quad Rank", an IP.com Prior Art Database Technical Disclosure, IP.com Electronic Publication: Dec. 17, 2005, 2 pages.
Petition for Inter Partes Review of U.S. Pat. No. 8,516,187 (on behalf of SMART Modular Technologies, Inc.), filed Aug. 22, 2014.
Petition for Inter Partes Review of U.S. Pat. No. 8,301,833 (on behalf of SMART Modular Technologies, Inc.), filed Aug. 22, 2014.

"Out of Stealth Mode, Start-Up MetaRAM Unveils New Technology That Quadruples DRAM Capacity", Press Release edited by Storage Newsletter on Feb. 28, 2008 at StorageNewsLetter.com, 8 pages.
"MetaRAM Develops New Technology That Quadruples Memory Capacity of Servers and Workstations; Reduces Price by Up to 90 Percent", Press Release provided by MetaRAM and published on MarketWired.com, Feb. 25, 2008, 3 pages.
"240pin DDR2 MetaSDRAM Registered DIMM based on 1 GB version C", Hynix Semiconductor, Product Description Rev. 0.2, Sep. 2008, 32 pages.
Extended European Search Report for European Application No. 12 817 751.6, dated Jun. 9, 2015.
File History U.S. Pat. No. 8,671,243.
File History for U.S. Appl. No. 60/941,586, filed Jun. 1, 2007, 23 pages.
Office Action dated Aug. 19, 2016 of the Chinese Patent Application No. 201280047758.X, 9 pages.
Catsoulis, "Designing Embedded Hardware: Create New Computers and Devices", O'Reilly Media, Inc. (2005). (67 pages).
Elmhurst et al., "A 1.8-V 128-Mb 125-MHz Multilevel Cell Flash Memory With Flexible Read While Write", IEEE Journal of Solid-State Circuits 38(11):1929-1933 (2003).
Final Office Action, dated Jun. 15, 2016, dated in U.S. Appl. No. 14/489,281, 10 pages.
Notice of Allowance in U.S. Appl. No. 12/240,916, dated Sep. 17, 2012.
Notice of Allowance in U.S. Appl. No. 13/536,173, dated Jul. 2, 2013.
Notice of Allowance in U.S. Appl. No. 13/905,053, dated Dec. 11, 2013.
Notice of Allowance in U.S. Appl. No. 13/905,048, dated Dec. 19, 2013, 8 pages.
Notice of Allowance in U.S. Appl. No. 14/173,219 dated Jul. 7, 2014.
Notice of Allowance in U.S. Appl. No. 13/559,476, dated Sep. 29, 2014.
Notice of Allowance in U.S. Appl. No. 14/489,269, dated Oct. 8, 2015.
Office Action in U.S. Appl. No. 13/536,176, dated on Apr. 15, 2013.
Office Action in U.S. Appl. No. 14/302,292, dated Dec. 21, 2015.
Patterson et al., "Computer Organization & Design: The Hardware/Software Interface" Morgan Kaufmann Publishers, Inc. (1998).
Petition for Inter Partes Review of U.S. Pat. No. 8,301,833, filed Sep. 29, 2008.
Petition for Inter Partes Review of U.S. Pat. No. 8,874,831, filed Jul. 26, 2012.
Petition for Inter Partes Review of U.S. Pat. No. 8,671,243, filed May 29, 2013.
Restriction Requirement in U.S. Appl. No. 12/240,916, dated Mar. 31, 2011.
U.S. Appl. No. 60/912,321, filed Apr. 17, 2007.
Intel 1.8 Volt Intel StrataFlash Wireless Memory (L18).
Microsoft Computer Dictionary Fifth Edition, 9 pages.
JEDEC Standard, Double Data Rate (DDR) SDRAM Specification, JESD79, Jun. 2000, 77 pages.
Microsoft Windows 2000 Professional Resource Kit, 76 pages.
Ex. 1004—IPR2017-00587 Ron Maltiel CV, 7 pages.
File History for U.S. Appl. No. 12/240,916, filed Sep. 29, 2008, 320 pages.
Bonella, Provisional Application for "Advanced Dynamic Disk Memory Module", 53 pages.
JEDEC Standard, DDR2 SDRAM Specification, JESD79-2B (Revision of JESD79-2A) Jan. 2005, 113 pages.
File History for U.S. Appl. No. 13/905,048, filed May 29, 2013, 181 pages.
Data Sheet, 74F257A Quad 2-line to 1-line selector/multiplexer, non-inverting (3-State), Product specification, IC15 Data Handbook Mar. 31, 1995, 10 pages.

* cited by examiner

REDUNDANT BACKUP USING NON-VOLATILE MEMORY

STATEMENT OF RELATED APPLICATION(S)

This application is a continuation of U.S. patent application Ser. No. 13/625,563, filed Sep. 24, 2012, titled, "Redundant Backup Using Non-Volatile Memory" which claims the benefit of U.S. provisional patent application Ser. No. 61/538,775, filed Sep. 23, 2011, titled "A METHOD OF USING STANDARD FLASH CONTROLLERS TO IMPLEMENT FLASH RAID STORAGE FUNCTIONALITY" and is a continuation-in-part (CIP) of U.S. patent application Ser. No. 12/240,916, filed Sep. 29, 2008, titled "NON-VOLATILE MEMORY MODULE," now U.S. Pat. No. 8,301,833 issued Oct. 30, 2012, which is a continuation of U.S. patent application Ser. No. 12/131,873, filed Jun. 2, 2008, which claims the benefit of U.S. provisional patent application Ser. No. 60/941,586, filed Jun. 1, 2007, the contents of all of which are incorporated herein by reference in their entirety.

This application may also be considered to be related to co-pending U.S. patent application Ser. No. 13/559,476 ("FLASH-DRAM HYBRID MEMORY MODULE"), filed on Jul. 26, 2012, and commonly owned herewith.

TECHNICAL FIELD

The present disclosure relates generally to non-volatile memory devices, and more particularly, to flash memory devices arranged in redundant arrays.

BACKGROUND

Memory devices used for computer data storage can be classified into two categories: volatile memory and non-volatile memory. For volatile memory, such as DRAM, maintaining device states and preserving stored information requires a constant supply of power. Any interruption of power will result in loss of stored information. Preventing such loss requires the use of back up batteries or other energy storage devices, which may be expensive, bulky and difficult to maintain.

Non-volatile memory, by comparison, does not need power to maintain its information content. However, non-volatile memory may not be as economical or efficient or fast as volatile memory, and has accordingly not replaced volatile memory as a viable data storage alternative. Nevertheless, in certain circumstances, it can be useful to back up volatile memory with non-volatile memory, for example to avoid catastrophic data loss in the event of power outage. Data thus backed up in non-volatile memory is preserved despite power disruptions, and can be copied back into the volatile memory when normal operation resumes.

It would be impractical to back up all non-volatile memory data all the time using volatile memory. More practical approaches rely on selective storage, of critical data only; or on detecting a potential power loss in advance and then backing up any critical data, or data that is intermediate to a currently-executing process, while some power still remains, or while a small, economical amount of power can be provided.

There are many types non-volatile memory. One common type is termed "flash" memory, and relies on charge storage in gates of floating-gate transistors. The charge storage is persistent and interruptions in power have no short term impact on the information content, endowing the memory with its non-volatile character. Individual flash memory cells, comprised of one or more floating-gate transistors, can be configured to store a single binary value (single-level cells, or SLCs), or multiple binary values (multi-level cells, or MLCs). The flash memory chip can comprise millions, or billions, of such cells, and is currently available in numerous formats, such as 2 gigabit (Gb), 4 Gb, 8 Gb, and so on. The chips themselves can be combined in various architectures in a memory module, to be accessed by way of a flash memory controller that selectively issues control and address commands to the flash memory chips for retrieval or storage of data based on the needs of the host device.

FIG. 1 is a block diagram of a typical flash memory module 100 that is used to provide data storage in support of a host system (not shown). The memory module 100 includes a dedicated, flash controller 102 which is in communication with any number of flash memory elements. In this example, four 2-gigabyte (GB) flash memory elements, designated $104_0$ through $104_3$, are employed. Data is exchanged bi-directionally between the controller 102 and the flash memory elements $104_0$ through $104_3$ for delivery to or from the host. The exchanges, in the form of read and write operations, are performed in concert with address and control signals that are issued by the controller 102 to selectively activate and manage the operation of the flash memory elements $104_0$ through $104_3$.

OVERVIEW

As described herein, in a host computer memory system having a volatile memory subsystem, a non-volatile memory subsystem, and a controller for managing the non-volatile subsystem, a method for redundantly backing up the volatile memory subsystem includes detecting a trigger condition, decoupling the volatile memory subsystem from the host based on the detected trigger condition, communicating one or more blocks of data from the volatile memory subsystem to the non-volatile memory subsystem, and redundantly storing said communicated one or more blocks of data in the non-volatile memory subsystem. The redundantly storing can include writing to a first channel of the volatile memory subsystem a first copy of the one or more blocks of data, and writing to a second channel of the volatile memory subsystem a second copy of the one or more blocks of data.

Also as described herein, a method for restoring to a volatile memory subsystem data that is redundantly-backed up in first and second channels of a non-volatile memory subsystem includes retrieving a first copy of the data from the first channel of the non-volatile memory subsystem, and retrieving a second copy of the data from the second channel of the non-volatile memory subsystem. If neither the first or second copy contains errors, communicating an error-free copy to the volatile memory subsystem. If error-free copies can be generated from both the first and second copies by correcting errors in the first and second copies, correcting said errors and communicating an error-free copy to the volatile memory subsystem. If an error-free copy can be generated from only one of the first or second copies because the one of the first or second copies contains correctable errors and the other of the first or second copies contains uncorrectable errors, generating said error-free copy from the one of the first or second copies by correcting the correctable errors, replacing the other of the first or second copies with the error-free copy, and communicating an error-free copy to the volatile memory subsystem.

Also as described herein, a memory system includes a non-volatile memory subsystem, a volatile memory subsystem couplable to a host, and a switching circuit operable to decouple the volatile memory subsystem from the host and to couple the volatile memory to the non-volatile memory subsystem based on a trigger condition. The non-volatile memory subsystem includes a first set of one or more memory elements, a second set of one or more memory elements, and a controller coupled to the first and second sets of memory elements and configured to operate the first set as a first channel to which a first copy of one or more blocks of data from the volatile memory subsystem is written in response to the trigger condition, and to operate the second set as a second channel to which a second copy of the one or more blocks of data from the volatile memory subsystem is written in response to the trigger condition.

Also as described herein, a memory system includes a volatile memory subsystem couplable to a host and a non-volatile memory subsystem. The non-volatile memory subsystem includes a first set of one or more memory elements, a second set of one or more memory elements, and a controller coupled to the first and second sets of memory elements and configured to operate the first set as a first channel in which a first copy of one or more blocks of data from the volatile memory subsystem is backed up, and to operate the second set as a second channel in which a second copy of the one or more blocks of data from the volatile memory subsystem is backed up, and to retrieve and error-check the first and second copies, and communicate an error-free copy of the first and second copies to the volatile memory subsystem.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a system of one or more computers, servers and software.

Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The term "exemplary" is used exclusively herein to mean "serving as an example, instance or illustration." Any embodiment described herein as "exemplary" is not necessarily to be construed as preferred or advantageous over other embodiments.

Figure 1:
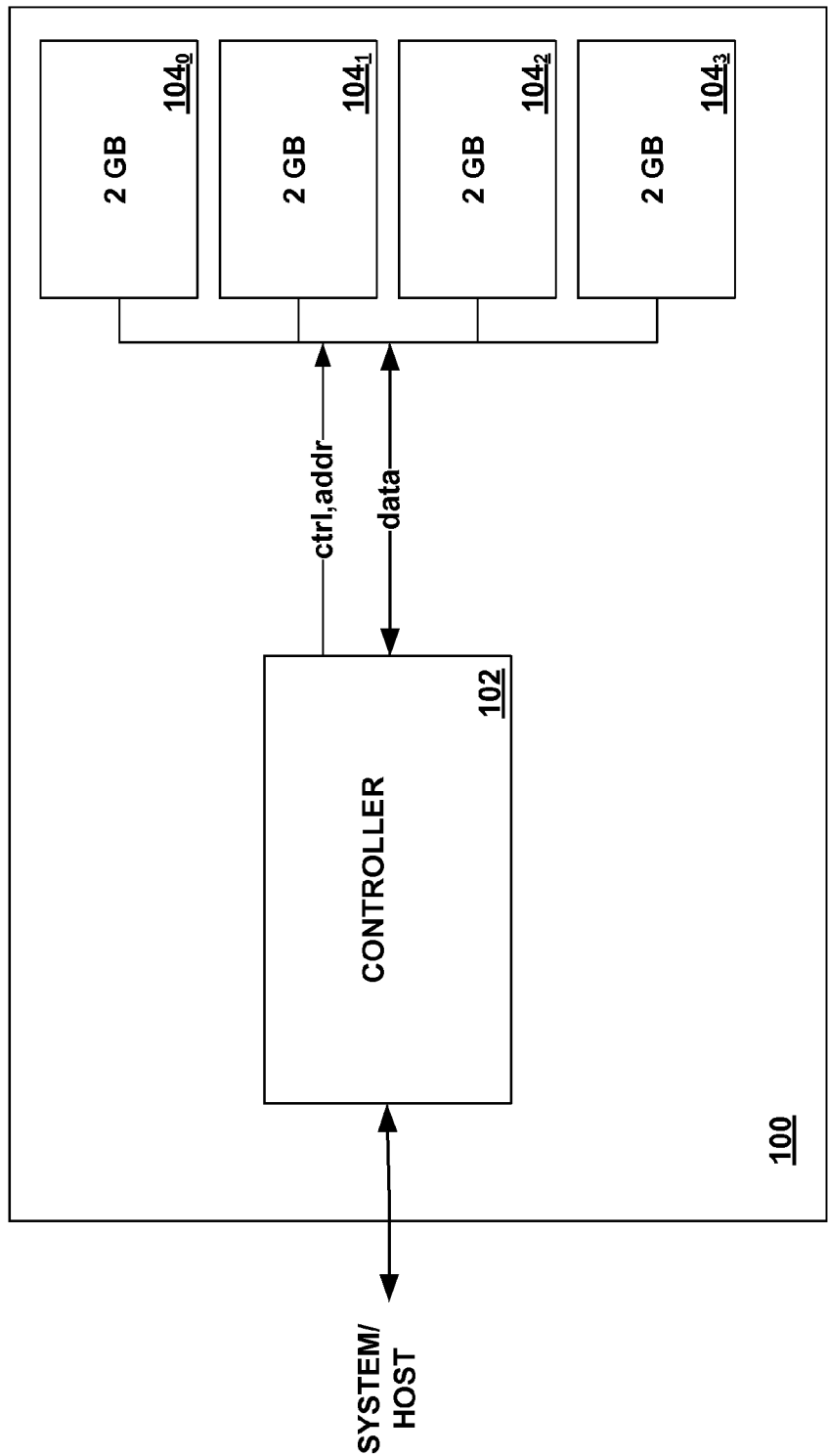
FIG. 1 is a block diagram of a typical flash memory module 100 that is used to provide data storage in support of a host system.
Figure 2:
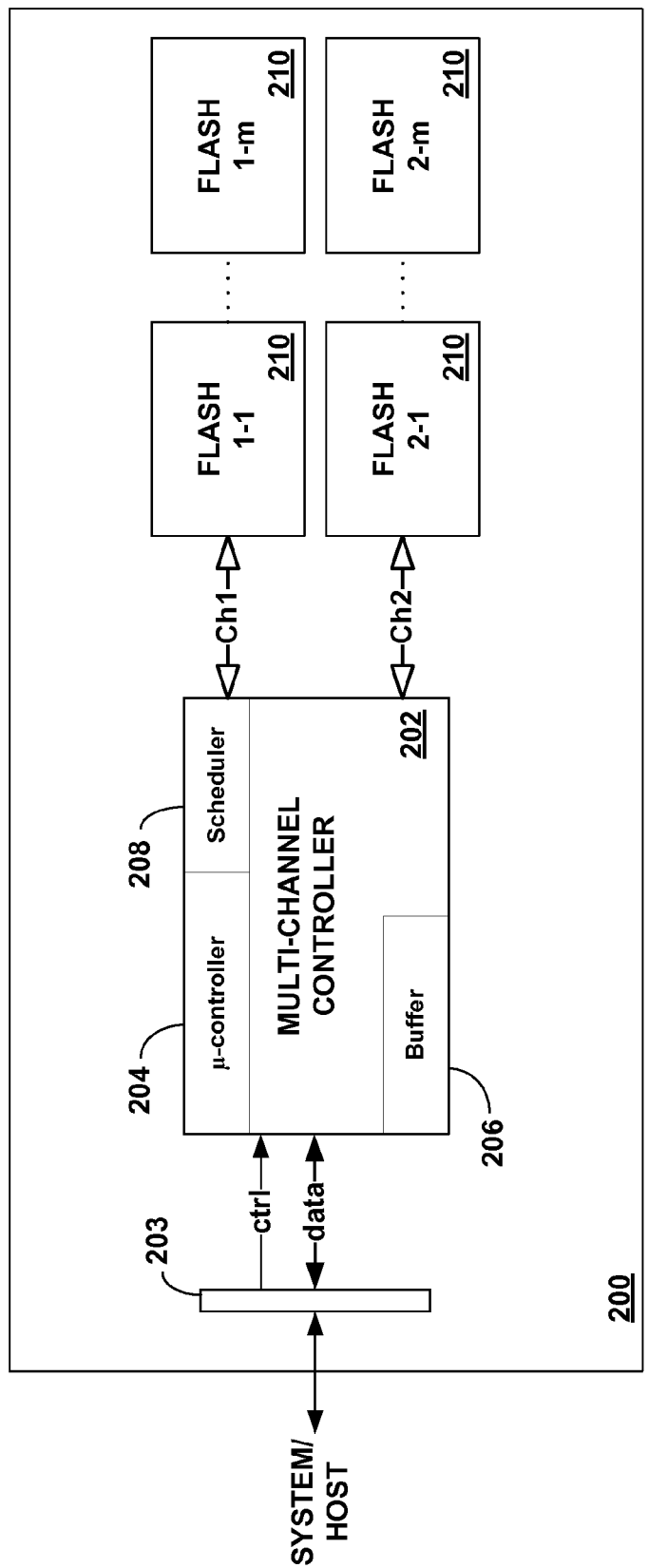
FIG. 2 is a block diagram of a multi-channel flash memory system 200 in accordance with certain embodiments herein.

FIG. 2 is a block diagram of a multi-channel flash memory system 200 in accordance with certain embodiments herein. The number of channels used in this example is two, channels Ch1 and Ch2, but it is to be understood that the principles described herein can be extended to a greater number of channels.

Multi-channel flash memory system 200 includes a controller 202 in communication with a host (not shown) by way of a host system interface 203. Controller 202 is responsible for communicating data, status and control information between the host and a plurality of non-volatile memory elements, in this example flash memory elements 210. Controller 202 receives from the host control signals and data, via interface 203, and writes the data into flash memory elements 210. Controller 202 also reads data from the non-volatile memory elements and delivers this read data to the host, via the interface 203. Controller 202 is thus generally responsible for communicating data, status and control information between the host system interface and the flash memory elements 210. In certain embodiments, controller 202 includes an internal embedded microcontroller 204 for managing its operations, including control of its firmware. Controller 202 also includes an internal data buffer 206 for buffering data passing to or from the host, and a scheduler or mini-kernel 208 for managing firmware. For a store or write operation, for instance, scheduler 208 of the controller 202 copies data, that is delivered from the host to internal buffer 206, into the flash memory elements 210 of the two channels Ch1 and Ch2. Conversely, for the read operation, data in the flash memory elements 210 is read into the buffer 206 and then delivered to the host.

Controller 202 is coupled at each channel to one or more of the flash memory elements 210. As shown, the first channel, Ch1, includes m flash memory elements 1-1-1-$m$, and the second channel, Ch2, includes m flash memory elements 2-1-2-$m$.

In one embodiment of the multi-channel flash memory system 200, the two channels Ch1 and Ch2 are configured to store identical copies of data received from the host. Thus controller 202 obtains for example $Data_A$ from the host and writes one copy of $Data_A$ into Ch1 (memory devices 1-1-1-$m$) and one identical copy of $Data_A$ into Ch2 (memory devices 2-1-2-$m$). Storing identical copies in multiple channels increases robustness and endurance of the memory, with the concept being extendable to multiple channels, for example paired channels, such as 4-channel or 8-channel storage.

Configuring the multi-channel flash memory system 200 to store identical copies of data in each of the two channels Ch1 and Ch2, and conversely to read the stored data from the two channels, is performed at the logical level, by programming the controller 202 firmware to perform these and other functions. This logical arrangement is illustrated in the block diagram of FIG. 2A, and is generalized for n channels.

Figure 2A:
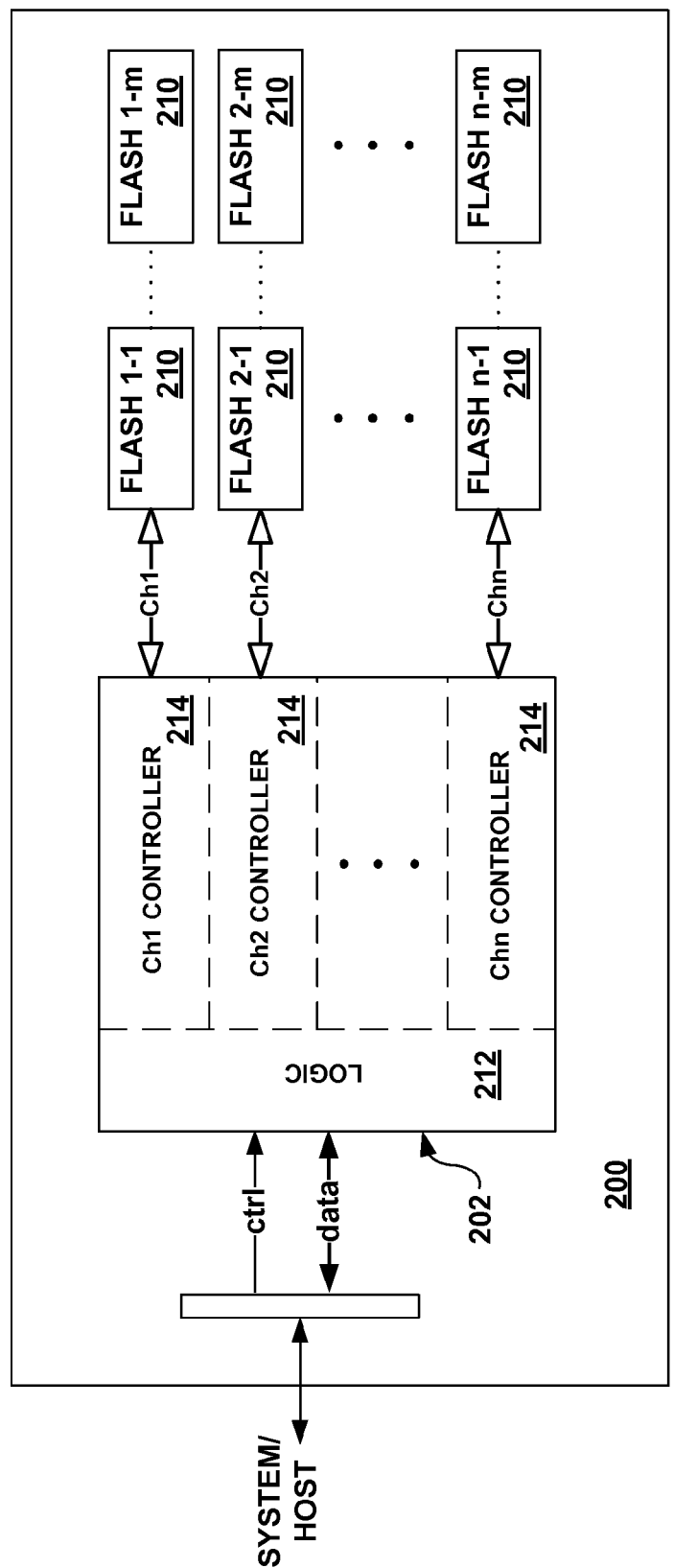
FIG. 2A is a block diagram of a logically-configured multi-channel non-volatile memory system.

As seen from FIG. 2A, a logic module 212 includes error correction functionality and redundancy logic control, as further described below. The error correction functionality can be in the form of ECC (error-correcting code). In certain embodiments, the logic module 212 includes embedded processor control with firmware upgrade capabilities and redundancy control. A plurality of logical controllers 214 each associated with a memory channel Ch1-Chn control the operations of the memory elements 210 in said channels.

Figure 3A:
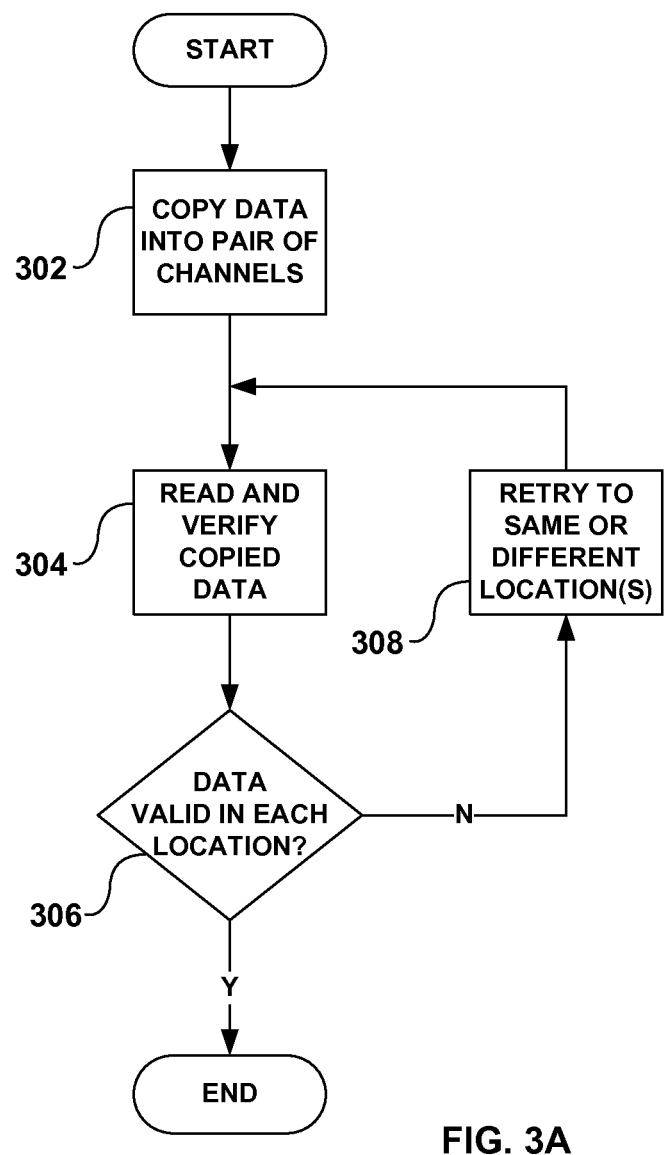
FIGS. 3A and 3B are flow diagrams illustrating the manner in which replica copies of data are stored, or written, into the two channels Ch1 and Ch2 of a multi-channel non-volatile memory system in accordance with certain embodiments.
Figure 3B:
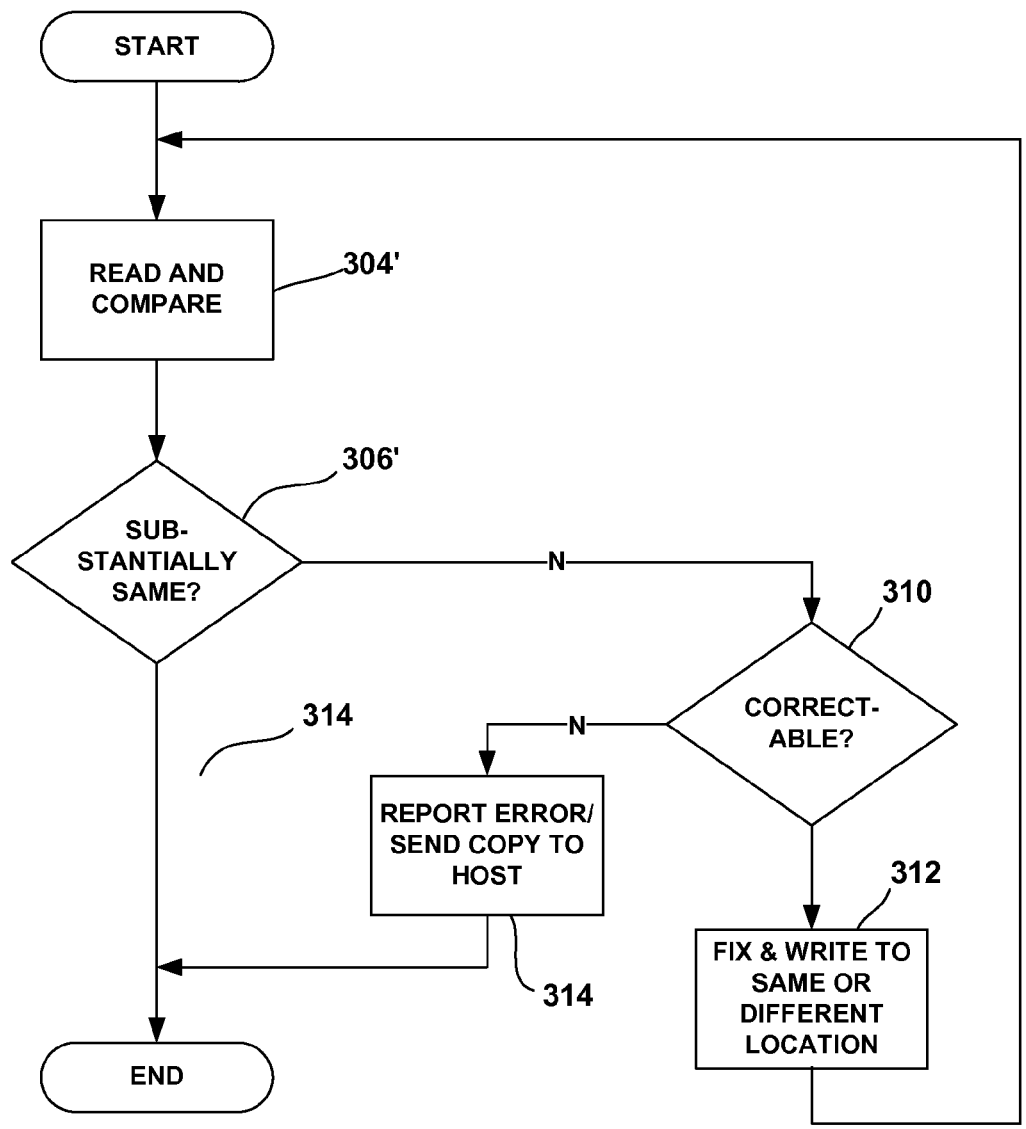

FIGS. 3A and 3B are flow diagrams illustrating the manner in which replica copies of data are stored, or written, into the two channels Ch1 and Ch2 of a multi-channel non-volatile memory system in accordance with certain embodiments. With reference to FIG. 3A, at 302, data received from the host and buffered in buffer 206 of controller 202 is written into a selected location in one or more memory elements 210 of Ch1, and into a selected location in one or more memory devices 210 of Ch2. At 304, a verification procedure is performed, to determine if the data thus written is valid. Generally, the verification procedure includes a comparison of the data written into channel Ch1 with the original data in the buffer 206; and a comparison of the data written into channel Ch2 with the original data in the buffer 206.

If the data in both channels is deemed to be valid at 306, then the process ends. If the data is deemed to be invalid in one or both channels, then at 308, the data in the buffer 206 of controller 202 is re-written into the channel or channels from whence the invalid data was read. The re-writing into each channel can be into the same selected location that the data was originally written, or it can be into a different location. In certain embodiments, therefore, the data written into buffer 206 is maintained for the purpose of this verification procedure, and the controller does not accept more data, for example from a subsequent write sequence, until completion of the verification procedure. In certain embodiments, however, controller 202 can have more than one buffer, one of which is used to retain the data for the verification phase, and the other of which is made available for a subsequent write sequence by the controller. Further, in certain embodiments in which more than one pair of redundant channels is employed, for example n pairs of redundant channels, then n+m buffers can be deployed by the controller, n buffers being dedicated to the verification procedure for each pair, and m buffers being made available to receive more data for subsequent write sequences or other processing or management operations by the controller.

FIG. 3B is flow diagram showing details of a verification procedure, such 304 above, in accordance with certain embodiments. Data from each of channels Ch1 and Ch2 is read and compared with the original data in buffer 206, at 304'. If the data in Ch1 and Ch2 match the original data in buffer 206 and the verification is successful, at 306', then the process is deemed completed and ends. If, on the other hand, it is determined at 306' that data from channel Ch1 and/or channel Ch2 is defective because it does not match the original data in buffer 206, then at 310, a determination is made whether a repair is possible. If possible, the data from the affected channel or channels is repaired, at 312, and is re-written into the same or a different selected location from that channel or channels. The process then loops back to the verification procedure 304' to ascertain that correct redundant copies have been stored in channels Ch1 and Ch2. In certain embodiments, in the case where data from only one channel needed to be repaired, then the verification procedure 304' is re-performed only on that channel. If a repair is not possible, then at 314 a notification is sent to the host that the write process was unsuccessful.

As mentioned above, in certain embodiments, controller 202 may contain multiple buffers 206. Such an arrangement would enable the controller to receive additional data, for the next write sequence for instance, even before the verification procedure 304/304' for the current write sequence has ended. Specifically, while the additional buffer may be filled with the next-sequence data, the data from the current write sequence can be retained in the buffer for use in the verification procedure 304/304' for comparison with the data in channels Ch1 and Ch2 and for re-writing into those channels as necessary.

Figure 4:
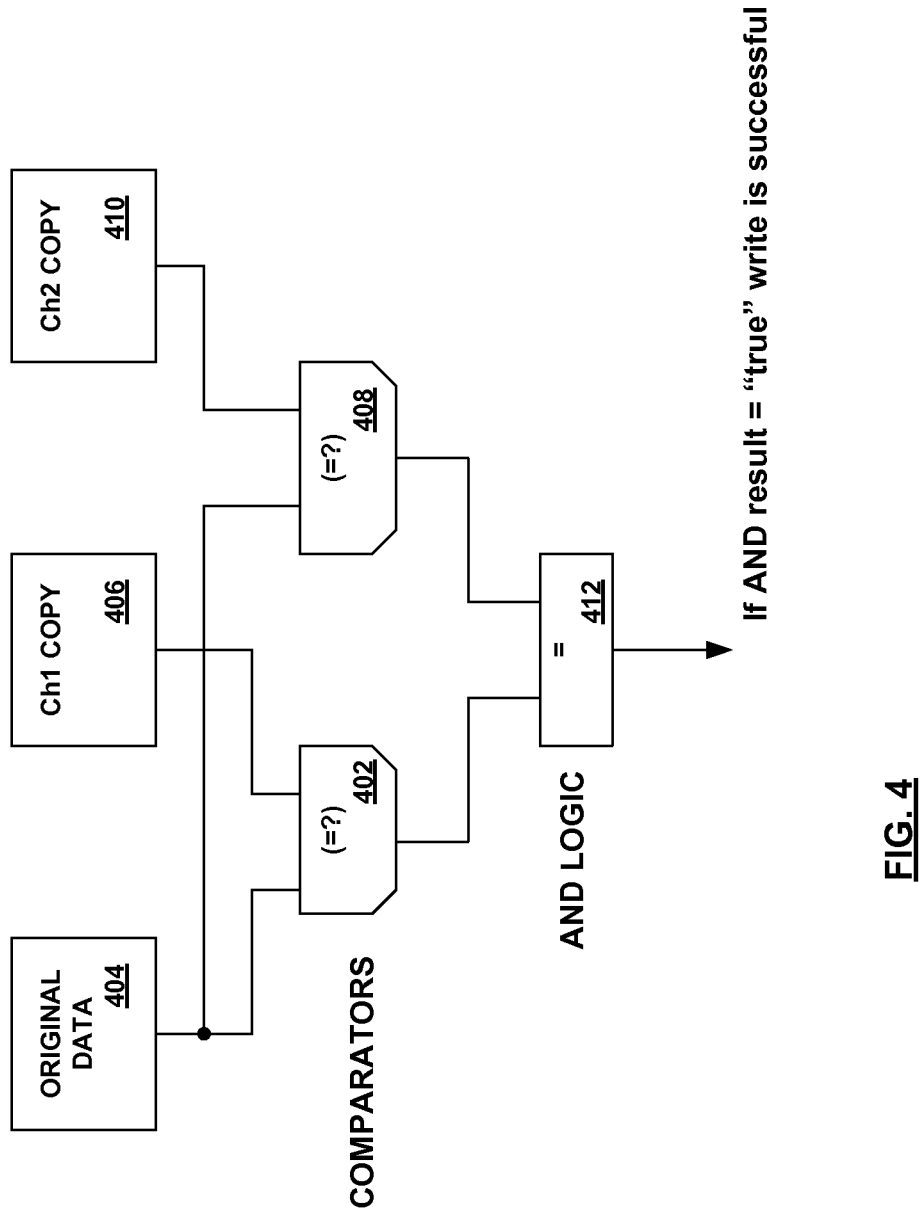
FIG. 4 is a block diagram showing the logic flow for a verification procedure such as that of FIGS. 3A and 3B accordance with certain embodiments.

FIG. 4 is a block diagram showing the logic flow for the verification procedure above in accordance with certain embodiments. Comparators 402 compare the original (404) and Ch1 (406) copy of the data. Comparators 408 compare the original (404) and Ch2 (410) copy of the data. The results of the comparisons are ANDed together in logic 412, and the write is deemed to be successful if the outcome of the AND operation is "true."

Figure 5:
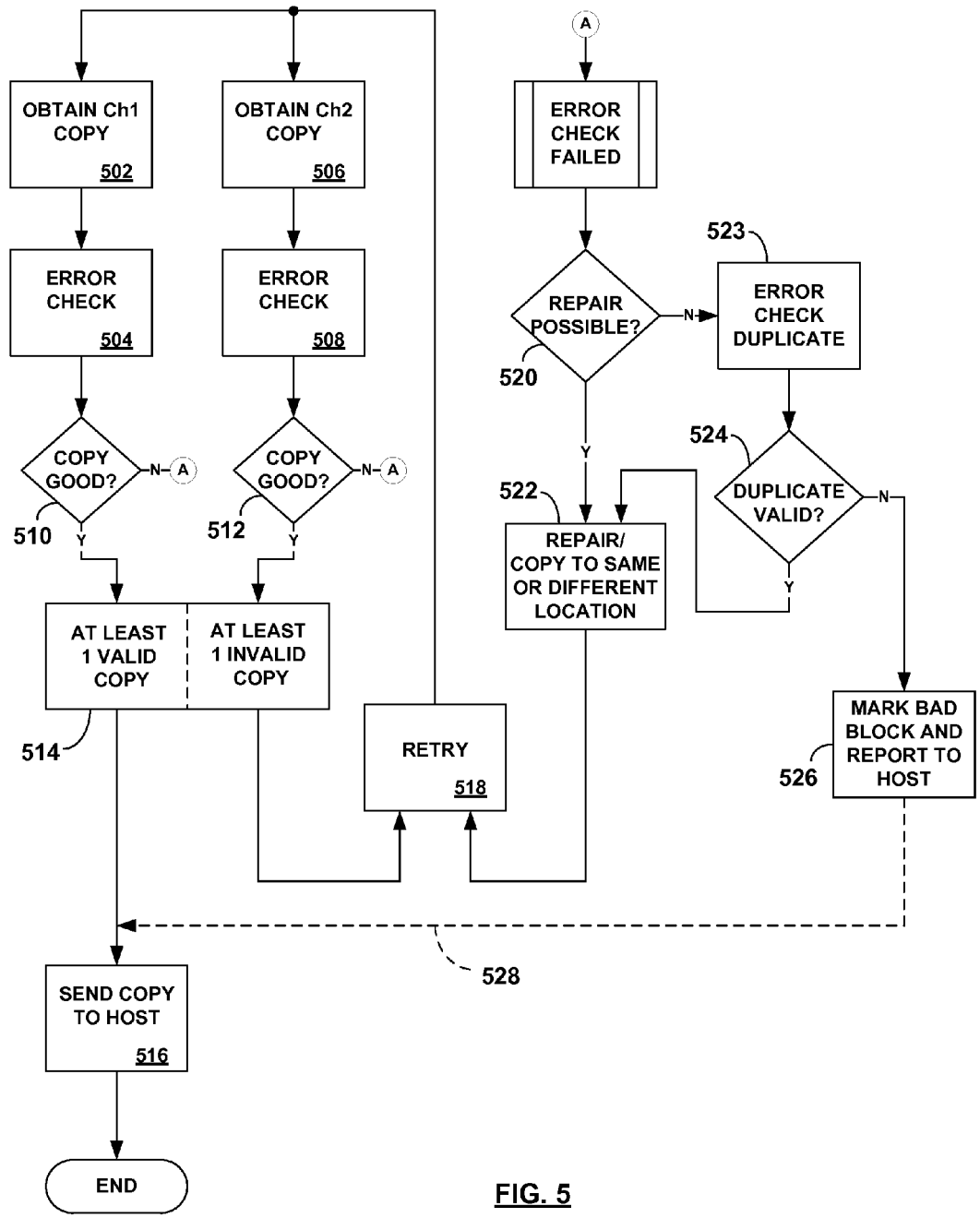
FIG. 5 is a flow diagram showing a read operation from channels Ch1 and Ch2 in accordance with certain embodiments.

FIG. 5 is a flow diagram showing a read operation from channels Ch1 and Ch2 in accordance with certain embodiments. The read operation is executed by the controller 202, which receives a request for data from the host and proceeds to retrieve the data that is redundantly stored in channels Ch1 and Ch2. Thus at 502, a first copy of the requested data is retrieved by the controller 202 from memory elements 210 of Ch1. The retrieved data is then error-checked at 504, for example according an ECC algorithm. Similarly, at 506, a second copy of the requested data is retrieved by the controller 202 from memory elements 210 of Ch2 and then error-checked at 508, for example according the ECC algorithm. If the retrieved data is found to be error free at 510 and 512, then process flows to decision 514, in which a determination is made whether at least one of the first or second data copies, from channel Ch1 or Ch2, is valid. If at least one copy is valid, a valid copy is sent to the host, at 516. Further, if at least one copy is found to be invalid, than a retry process 518 is commenced, with the flow looping back to 502 and 506.

If, following the error checks at 504 and 508, the retrieved data from channels Ch1 or Ch2 is found to contain an error, at 510 and/or 512, then a determination is made, at 520, of whether the error(s) is correctible. If so, then a repair is performed to the data in the channel that was found to contain the error, at 522, and the repaired version is written into the same or a different location in that channel. Then the process is repeated, beginning at 518.

If, at 520, it is determined that a repair is not possible and the error is uncorrectable, then a check of the duplicate copy from the other channel is performed at 523, and at 524 it is determined if the duplicate data is valid—that is, is error-free based on the error check or if it had an error that was corrected. If the duplicate data is valid, then the duplicate data is copied into the same or different location in the channel that was found to contain the error, at 522, and the process repeats at 518.

If, at 524, it is determined that the duplicate data, from the other channel, is not valid, then at 526, the data block is deemed to be bad and the host is notified, for example with an uncorrectable error message. In certain embodiments, a copy of the bad data is delivered to host as well, as seen at 528, for analysis and reporting or further repair attempts by the host.

In certain embodiments, controller 202 may contain multiple buffers 206. In a read procedure such as that of FIG. 5, multiple buffers would enable the controller to deliver a valid copy of the retrieved data from one of the channels Ch1 or Ch2 to the host (at 514, 516) while attempting the repair procedure in the background, using a copy of the valid data retained in the additional buffer.

Returning to 524, when, after an error check, it was been determined that a first copy is invalid, and the duplicate copy is being assessed for validity, then as explained above, if the duplicate copy is indeed valid, then the duplicate copy can be written into the same or a different location from which the first, invalid copy was fetched, and the duplicate copy can be sent to the host. In certain embodiments, it may not be necessary to send or write the entire duplicate copy into the same or a different location of the first copy. Rather, it may be possible to re-write only the portions, or pages, that are found to be defective, to conserve time or resources. The validity assessment and re-writing, therefore, is done on a portion-by-portion basis, which may be a page, or a line, or other portion. In this manner an error-free copy can be generated by replacing only error-containing portions of the defective copy. That is, the error-free copy is generated by combining error-free portions of the two copies.

Figure 6:
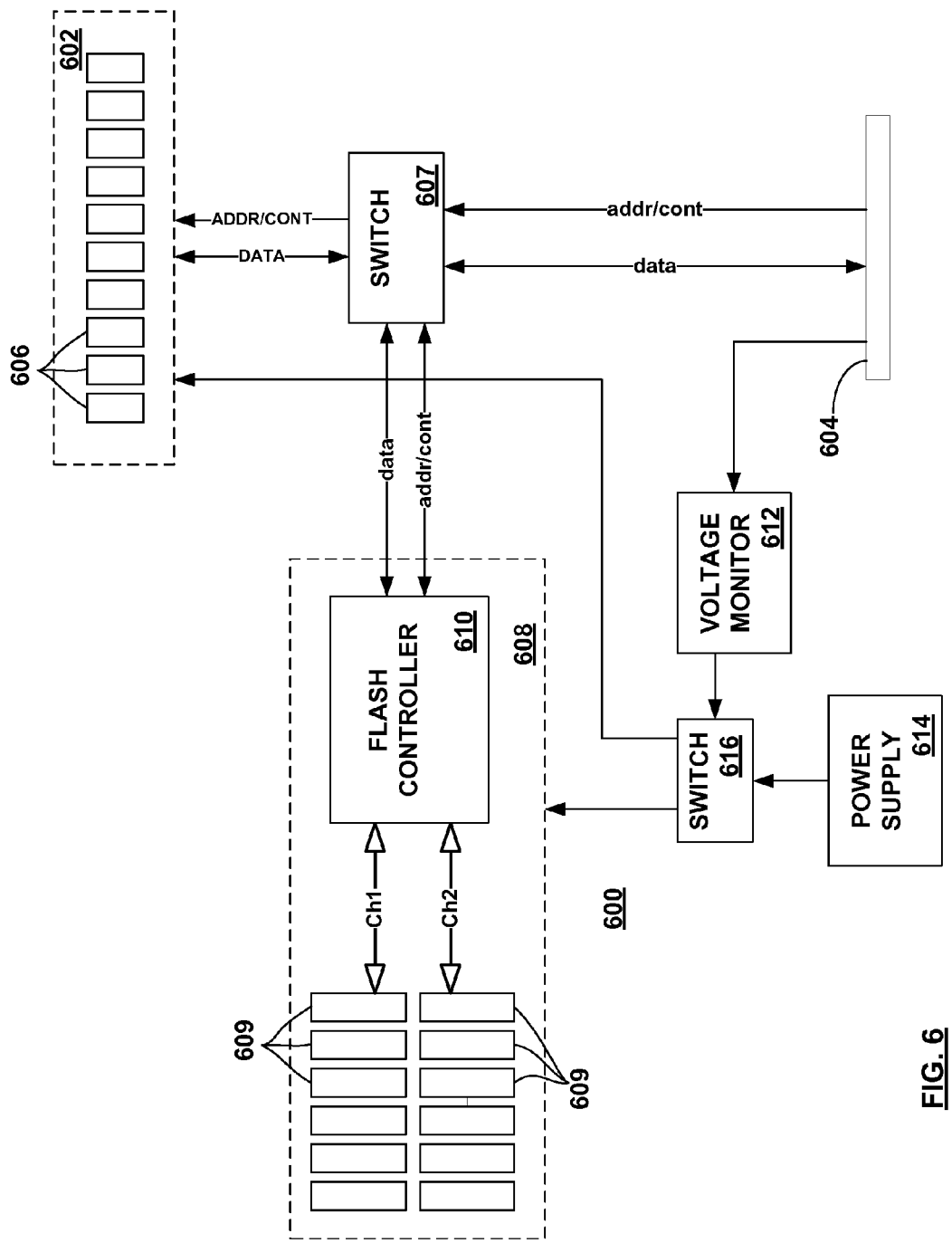
FIG. 6 is a block diagram of an example memory system 600 configured to provide redundant backup capabilities in accordance with certain embodiments.

FIG. 6 is a block diagram of an example memory system 600 configured to provide redundant backup capabilities in accordance with certain embodiments described herein. Memory system 600 includes a volatile memory subsystem 602 normally in communication with a host (not shown) via host interface 604, for delivery of data to and from the host (not shown) based on address and control commands received from the host. A plurality of volatile memory elements 606 are coupled to the host to provide normal memory functionality. In certain embodiments, the plurality of volatile memory elements 606 comprise two or more dynamic random-access memory (DRAM) elements. Types of DRAM elements 606 compatible with certain embodiments described herein include, but are not limited to, DDR, DDR2, DDR3, and synchronous DRAM (SDRAM). The volatile memory elements 606 may comprise other types of memory elements such as static random-access memory (SRAM). In addition, volatile memory elements 606 having bit widths of 4, 8, 16, 32, as well as other bit widths, are compatible with certain embodiments described herein. Volatile memory elements 606 compatible with certain embodiments described herein have packaging which include, but are not limited to, thin small-outline package (TSOP), ball-grid-array (BGA), fine-pitch BGA (FBGA), micro-BGA (u-BGA), mini-BGA (mBGA), and chip-scale packaging (CSP).

Memory system 600 is designed to provide memory backup that can be used to guard against data loss when power interruption is threatened. Non-volatile memory subsystem 608 provides the backup storage, and takes the form of a multi-channel arrangement of non-volatile memory devices, for example flash memory elements 609, as described above. In certain embodiments, the backup operation is under the direction of a backup flash controller 610, logically configured to provide the redundancy functionality as described with reference to FIGS. 2 and 2A above, and further operative to provide backup functionality in the event of a sensed interruption or imminent interruption of power, and more generally, in response to any trigger condition as detailed hereinbelow and in co-pending application Ser. No. 12/240,916. While described in terms of two channels, Ch1 and Ch2, it will be recognized a greater number of channels may be used, paired or otherwise.

Memory system 600 includes a switching circuit 607 disposed in the data transfer path between the host and the volatile memory subsystem 602. Switching circuit 607 is operative to selectively couple and decouple the host from the volatile memory subsystem 602, and to selectively couple and decouple the volatile memory subsystem 602 from a non-volatile memory subsystem 608, under the direction of flash memory controller 610.

The memory system 600 of certain embodiments is configured to be operated in at least two states. The at least two states can comprise a first state in which the controller 610 and the non-volatile memory subsystem 608 are operatively decoupled, or substantially isolated, from the volatile memory subsystem 602 by the switching circuit 607, and a second state in which the volatile memory subsystem 602 is operatively coupled to the flash controller 610 to allow data to be communicated between the volatile memory subsystem 602 and the non-volatile memory subsystem 608 via the controller 610. The memory system 600 may transition from the first state to the second state in response to the trigger condition, such as when the memory system 600 and/or host detects that there is an imminent power interruption (that is, power failure or reduction) or a system hang-up.

The memory system 600 may further comprise a voltage monitor circuit or module 612. The voltage monitor 612 monitors the voltage supplied by the host system via the interface 604. In certain embodiments, the voltage monitor 612 is part of the controller 610. Upon detecting a low voltage condition (e.g., due to a power interruption to the host system), the voltage monitor 612 may transmit a signal to the controller 610 indicative of the detected condition. The controller 610 of certain embodiments responds to the signal from the voltage monitor 612 by transmitting a signal to the switching circuit 607 to operatively couple the controller to the volatile memory subsystem 602, and decouple the volatile memory subsystem 602 from the host, such that the memory system 600 enters the second state. For example, the voltage monitor 612 may send a signal to the controller 610 which responds by accessing the data in the volatile memory subsystem 602 and by executing a write cycle on the non-volatile memory subsystem 608. During this write cycle, data is read from the volatile memory subsystem 602 and is transferred to the non-volatile memory subsystem 608 via the controller 610. This transfer of data from the volatile to the non-volatile memory subsystems can be performed in accordance with the redundancy procedures described above, but in this case data source is the volatile memory subsystem 602 rather than the host. In particular, a multi-channel logical configuration is used, whereby, in the illustrated two-channel example, the two channels Ch1 and Ch2 of non-volatile memory subsystem 608 are configured to store in memory elements 609 identical copies of data received from the volatile memory system 602. In certain embodiments, the procedure followed is substantially the same as that described with reference to FIGS. 3 and 4, and includes the error correction performed by the flash controller 610.

Power may be supplied to the volatile memory subsystem 602 from a first power supply (for example a system power supply, not shown) when the memory system 600 is in the first state, and from a second power supply 614 when the memory system 600 is in the second state. In certain embodiments, the memory system 600 is in the first state when no trigger condition is present, and the memory system 600 enters the second state in response to a trigger condition. In certain embodiments, the memory system 600 has a third state in which the controller 610 is operatively decoupled from the volatile memory subsystem 602 and power is supplied to the volatile memory subsystem 602 from a third power supply (not shown). For example, in one embodiment the third power supply may provide power to the volatile memory subsystem 600 when the memory system 600 detects that a trigger condition is likely to occur but has not yet occurred.

In certain embodiments, the second power supply 614 does not comprise a battery. Because a battery is not used, the second power supply 614 of certain embodiments may be relatively easy to maintain, does not generally need to be replaced, and is relatively environmentally friendly. In certain embodiments the second power supply 614 comprises one or more capacitors and supporting circuits, as described in co-pending application Ser. No. 12/240,916.

In certain embodiments the memory system 600 further comprises a switch 616 (e.g., FET switch) that switches power provided to the controller 610, the volatile memory subsystem 602, and the non-volatile memory subsystem 608, between the power from the second power supply 614 and power from the first power supply (e.g., system power) received via the interface 604. For example, the switch 616 may switch from the first power supply to the second power supply 614 when the voltage monitor 612 detects a low voltage condition. The switch 616 of certain embodiments advantageously ensures that the volatile memory elements 606 and non-volatile memory elements 609 are powered long enough for the data to be transferred from the volatile memory elements 606 and stored in the non-volatile memory elements 609. In certain embodiments, after the data transfer is complete, the switching circuit 607 then switches back to the first power supply and the controller 610 transmits a signal to switching circuit 607 to operatively decouple the controller 610 from the volatile memory subsystem 602, such that the memory system 600 re-enters the first state.

When the memory system 600 enters or re-enters the first state, data may be transferred back from the non-volatile memory subsystem 608 to the volatile memory subsystem 602 via the controller 610. The host system can then resume accessing the volatile memory subsystem 602 of the memory system 600. In certain embodiments, after the memory system 600 enters or re-enters the first state (e.g., after power is restored), the host system accesses the volatile memory subsystem 602 rather than the non-volatile memory subsystem 604 because the volatile memory elements 602 may have superior read/write characteristics.

The transfer back of data from the non-volatile to the volatile memory subsystems upon entry or re-entry of the first state is referred to as a restore operation. In certain embodiments, the restore operation takes place in accordance with the read procedure described above with reference to FIG. 5. The read operation is executed by the controller 610, which proceeds to retrieve the data redundantly stored in memory elements 609 of Ch1 and Ch2 of the non-volatile memory subsystem 608. The fetched data from each channel is then error-checked, the errors are corrected where possible and an error-free copy is generated for delivery to the volatile memory subsystem 602 by the controller 610.

Figure 7:
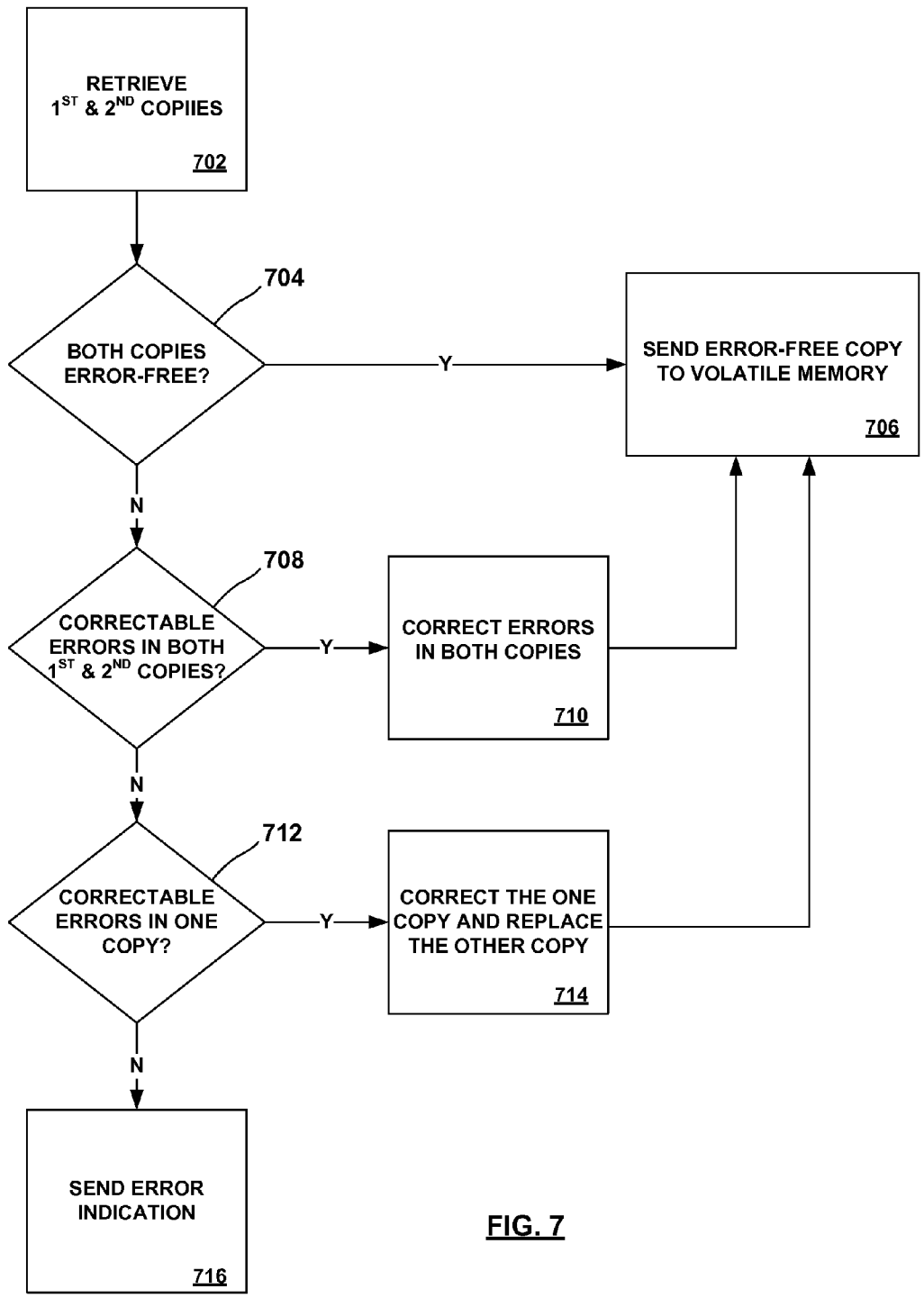
FIG. 7 is a flow diagram illustrating a backup restore operation in accordance with certain embodiments.

FIG. 7 is a flow diagram illustrating a backup restore operation in accordance with certain embodiments. At 702, redundantly-stored copies of the data are retrieved from the pair of channels Ch1 and Ch2 of non-volatile memory subsystem 608. At 704, it is determined whether both copies are data error-free. If they are, then an error-free copy is sent to the volatile memory subsystem 602 at 706, based on either the retrieved first or second copies. At 708, it is determined if data errors in both copies can be correctable. If they are, then at 710, the errors in both copies are corrected to thereby generate a recovered copy, and the recovered error-free copy is delivered to volatile-memory subsystem 602 at 706. At 712, it is determined if one copy contains correctable errors and can be used to generate a recovered error-free copy. If so, then at 714, the error-free copy is generated and the uncorrectable copy is replaced therewith, and at 706, the recovered error-free copy is delivered to volatile-memory subsystem 602. If, at 712, it is determined no copies contain correctable errors and can be used to generate an error-free copy, then an error indication is sent, at 716.

In certain embodiments, the memory system 600 copies the entire contents of the volatile memory subsystem 602 into the non-volatile memory subsystem 608 on each backup operation. Moreover, in certain embodiments, the entire contents of the non-volatile memory subsystem 608 are copied back into the volatile memory subsystem 602 on each restore operation. In certain embodiments, the entire contents of the non-volatile memory subsystem 608 are accessed for each backup and/or restore operation, such that the non-volatile memory subsystem 608 (e.g., flash memory subsystem) is used generally uniformly across its memory space and wear-leveling is not performed by the memory system 600. In certain embodiments, avoiding wear-leveling can decrease cost and complexity of the memory system 600 and can improve the performance of the memory system 600. In certain other embodiments, the entire contents of the volatile memory subsystem 602 are not copied into the non-volatile memory subsystem 608 on each backup operation, but only a partial copy is performed. In certain embodiments, other management capabilities such as bad-block management and error management for the flash memory elements of the non-volatile memory subsystem 608 are performed in the controller 610.

In certain embodiments, there may be more than 100 percent more storage capacity in the non-volatile memory subsystem 608 than in the volatile memory subsystem 602. In various embodiments, there may be at least 200, 300, or 400 percent more storage capacity in the non-volatile memory subsystem 608 than in the volatile memory subsystem 602. In other embodiments, the non-volatile memory subsystem 608 includes at least some other integer multiples of the storage capacity of the volatile memory subsystem 602. In some embodiments, the non-volatile memory subsystem 608 includes a non-integer multiple of the storage capacity of the volatile memory subsystem 602. In one embodiment, the non-volatile memory subsystem 608 includes less than 100 percent more storage capacity than does the volatile memory subsystem 602.

The extra storage capacity of the non-volatile memory subsystem 608 can be used to improve the backup capability of the memory system 600. In certain embodiments in which data can only be written to portions of the non-volatile memory subsystem 608 which do not contain data (e.g., portions which have been erased), the extra storage capacity of the non-volatile memory subsystem 608 allows the volatile memory subsystem 602 to be backed up in the event of a subsequent power failure or other trigger event. For example, the extra storage capacity of the non-volatile memory subsystem 608 may allow the memory system 600 to backup the volatile memory subsystem 602 efficiently in the event of multiple trigger conditions (e.g., power failures). In the event of a first power failure, for example, the data in the volatile memory system 602 is copied to a first, previously erased portion of the non-volatile memory subsystem 608 via the controller 610. Since the non-volatile memory subsystem 608 has more storage capacity than does the volatile memory subsystem 602, there is a second portion of the non-volatile memory subsystem 608 which does not have data from the volatile memory subsystem 602 copied to it and which remains free of data (e.g., erased). Once system power is restored, the controller 610 of the memory system 600 restores the data to the volatile memory subsystem 602 by copying the backed-up data from the non-volatile memory subsystem 608 back to the volatile memory subsystem 602. After the data is restored, the memory system 600 erases the non-volatile memory subsystem 608. While the first portion of the non-volatile memory subsystem 608 is being erased, it may be temporarily un-accessible.

If a subsequent power failure occurs before the first portion of the non-volatile memory subsystem 608 is completely erased, the volatile memory subsystem 602 can be backed-up or stored again in the second portion of the non-volatile memory subsystem 608 as described herein. In certain embodiments, the extra storage capacity of the non-volatile memory subsystem 608 may allow the memory system 600 to operate more efficiently. For example, because of the extra storage capacity of the non-volatile memory subsystem 608, the memory system 600 can handle a higher frequency of trigger events that is not limited by the erase time of the non-volatile memory subsystem 608.

As detailed in co-pending application Ser. No. 12/240,916, the volatile memory subsystem 602 may normally be run at a higher frequency (e.g., DRAM running at 400 MHz) than the non-volatile memory subsystem 608 (e.g., flash memory running at 62.5 MHz) when communicating with the host system (e.g., when no trigger condition is present). However, in certain embodiments the volatile memory subsystem 602 may be operated at a reduced frequency (e.g., at twice the frequency of the non-volatile memory subsystem 608) without introducing significant delay into the system during backup operation and/or restore operations. Running the volatile memory subsystem 602 at the reduced frequency during a backup and/or restore operation may advantageously reduce overall power consumption of the memory system 600.

The redundancy backup mechanisms described above provide an added level of security and robustness to the backup system. One reason is that the probability of getting the same uncorrectable error associated with one read trial within two channels is defined as:

$$P(A) = \frac{1}{100K}, P(B) = \frac{1}{100K}$$

where 100K is the program/erase endurance of SLC flash products. As flash page program/erase approaches 100K cycles, the probability of getting uncorrectable error will increase for that location.

$$P(A \cap B) = P(A) \times P(B) = \frac{1}{100K} \times \frac{1}{100K} =$$
$$\frac{1}{10B} = 0.00001 \times 0.00001 = 0.0000000001 = 1 \times 10^{-10}$$

Assuming flash controllers will follow MFG suggested ECC methods to maximize flash 100K program/erase cycles, then using redundant flash storage, one can improve flash endurance due to improved uncorrectable errors to $1 \times 10^{-10}$.

Endurance of flash, means after a number of program/erase cycles the floating gates start to "wear out," and become defective. A certain amount of defective gates can be compensated by ECC. However, once the amount of defective gates (bit error rate) within a block is larger than ECC the block can be mapped as a bad block.

bit error rate of a block>ECC capability=bad block

The endurance of typical SLC flash is equal to about 100K program/erase cycle with an ECC of 1-bit engine. The following is an example of an endurance calculation of 2 GB SLC flash product: (1) Assuming size of data is 256 KB (file site), what is the endurance of 2 GB SLC card?

Page size=4 KB (4096)
Block size=64 pages=256 KB
Device size=8192 Block=8192*256 KB=2 GB
Since the file size is equal block size of 256 KB, then the produce endurance is:
8192 block*100K=781.25 million block program/erase cycle The lifetime of this product, assuming an application of 1 cycle every minute, is:
lifetime=endurance/frequency in years
lifetime=approximately 800.00 M/(1 cycle×60 min×24 hrs×365 days)=800.00 M/525600=1522 years The lifetime of the same product, assuming an application of 1 cycle every second, is:
lifetime=~800 M/(1 cycle×60 sec×60 min×24 hrs×365 days)=800 M/31536000=25.36 years.

Assuming the file size can be larger, the results will be, if the file is 2 MB, 200 MB, 2 GB (matching card size), (1 second program/erase):
  a) for 2 MB file, we will consume 8 blocks as such:
  2048 Kbyte (2 MB) 256 KB (block size)=8 blocks
  So 800 M cycle/8=100 M cycle; then
  lifetime=100 M/31536000=3.17 years
  b) 200 MB file size, program/erase every second?
  so 200 MB=256 KB=800 blocks
  lifetime=1 M/31536000=0.0317 years
  If the write/erase is every hour instead:
  then lifetime=1 M/8760=114 years instead.
  Or what if we write/erase every minute instead?
  then lifetime=1 M/525600=1.9 years
  c) For 2 GB file size, program/erase every hours and minutes?
  so 2048 MB 256 KB=8192 blocks (entire product)
  then lifetime=100 K/8760=11.4 years (once every hour)
  or lifetime=100 K/525600=0.19 years (once every minute)

The lifetime of each flash product is determined by file size and frequency of program/erase cycles.

lifetime=endurance (#block×SLC 100 K)/Frequency of program/erase in year. Using a flash redundant storage, the lifetime of product would not improve, as both devices will wear out at the same time, thus the endurance is the same.

The transfer time and program (flash busy time) of 1-channel and 2-channel would be the same as 2-channel flash controllers have dedicated buffers, flash controllers, and ECC engines per each channel.

There would be no additional penalty for redundancy implementation, during first write attempts, if the controller performs read-verify then, based on controller clock speed and architecture there would be additional time penalty for each successful verification and/or each non-successive verification and re-write operation.

The read page is 35 μsec max in this example, thus when read-verify is performed it will take the controller: max 35 μsec to read a page into data buffer and then transfer it into internal controller buffer in either asynchronous or synchronous fashion which can be 200 MT/sec (synch) or 20 ns (asynch).

The verification portion will be internal to flash architecture and it changes from vendor to vendor.

Assuming a read-verify of one block, then:
  (Read) 35 μsec+(verify)~20 μsec=55 μsec.
  If a worst case re-write and re-verify then:
  $1^{st}$ program 300 μsec+$1^{st}$ read-verify 55 μsec+$2^{nd}$ program 300 μsec+$2^{nd}$ read-verify 55 μsec=710 μsec The time needed to read a block and correct the error and re-write would be:
  1 block read 35 μsec+(verify)~20 μsec+write new location 300 μsec+read-verify 35 μsec+~20 μsec=410 μsec However, the system can have the data by 55 μsec, the rest is internal to fix the issue. Reading dual channel verification if the first trial were bad:
  Read 35 μsec+verify ~20 μsec+read (2nd) 35 μsec+verify ($2^{nd}$) 20 μsec=110 μsec.

Read-verify and we get one channel bad (discrepancies) and can fix and re-write, then check again for goodness of data in both channels:
  Read 35 μsec+verify 20 μsec+perform ECC fix ~30 μsec+write new location 300 μsec+read ($2^{nd}$) 35 μsec+verify ($2^{nd}$) 20 μsec=440 μsec.

Read-verify has discrepancies, retry not matched, ECC cannot fix, checking duplicate ECC is good, perform fix, retry, re-verify.

Read 35 μsec+verify 20 μsec+retry read (2) 35 μsec+verify (2) 20 μsec+ECC check ~30 μsec+check ECC results ~20 μsec+checking duplicate ECC ~30 μsec+fix re-write 300 μsec+read 35 μsec+verify 20 μsec=545 μsec.

Therefore in this example with the assumption that the write block will take 300 μsec, and read will take 35 μsec, the worst write would be=710 μsec, and the worst read would be=545 μsec.

This analysis clearly shows that even using this dual redundancy method, the worst case assumption still below 1 msec, and roughly equal to one block erase time of 700 μsec.

Assuming the use of a 2 GB flash product using SLC type devices with 100K program/erase cycles once we use the suggested ECC (for example, 8-bit/512B) then if an application that writes a file of 2 GB size is used and perform repetitive write overtime is performed, under normal configuration, the card bit error rate will be larger than ECC capabilities once the write cycles approach 100K, and beyond. Then the card will have bad blocks which impede further write and will generate uncorrectable errors. To determine the probability of getting the same cell, within the same page, within the same block within both channels:

Using two independent events (mutually independent event) the probability will be:
  $Pr(N_{i=1}{}^n A i) = \pi_{i=1}{}^n Pr(A_i)$
  A(1)=Probability of uncorrectable error=100K
  A(2)=Probability of uncorrectable error=100K
  $Pr(A \cap B) = P(A) \times P(B) = 100K \times 100K$
  $Pr(A \cap B) = 10,000,000,000 = 10$ billion Using this probability one can re-calculate the lifetime of an application writing a 2 GB file into a 2 GB std. vs. redundant flash storage with a frequency of 1 wr/each second and see the benefit
  storage size=2 GB
  file size=2 GB
  page size=4 KB
  block size=64 pages=256 KB
  device size=8192 blocks=2 GB
  Endurance=# of blocks*100 K program/erase (SLC)= 1*100 K=100 K Accordingly the standard (non-redundant) configuration will have an endurance of 100 K program/erase cycle. Thus
  lifetime=endurance/frequency (year)=100 K/(1*60 sec* 60 min*24 hrs*365)=100 K/31536000=0.00317 year Now assuming dual channel redundant storage and save:
  Endurance=ch 1 (100 K)×ch 2 (100 K)=10 Billion
  lifetime=10 B/31536000=317 years This clearly shows that the redundant storage product lifetime is superior by more than two factors as earlier estimated.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:
1. A memory system comprising:
a host interface couplable to a host computer;
a circuit coupled to the host interface by way of a data bus and an address and control (addr/cont) bus, the circuit operable to receive data from and deliver data to the host computer based on addr/cont signals received from the host computer;

a volatile memory subsystem coupled to the circuit by way of a first data bus and a first addr/cont bus;

a controller coupled to the circuit by way of a second data bus and a second addr/cont bus;

a voltage monitor circuit coupled to the controller, the voltage monitor circuit operable to monitor a voltage supplied by the host computer via the host interface and to provide a control signal to the controller in response to sensing one or more of a low voltage condition, an imminent power interruption, a power failure, a power reduction, or when power is restored; and a non-volatile memory subsystem coupled to the controller by way of first and second channels, the non-volatile memory subsystem including (i) a first set of one or more non-volatile memory elements coupled to the first channel, and (ii) a second set of one or more non-volatile memory elements coupled to the second channel, the controller operable to communicate data, status and control information between the host and the non-volatile memory system by way of the host interface, wherein, in response to the control signal received from the voltage monitor circuit, the controller is operable to (i) receive data from the volatile memory subsystem by way of the circuit, (ii) write a first copy of the received data from the volatile memory subsystem into the first set of one or more non-volatile memory elements using the first channel, and (iii) write a second copy of the data into the second set of one or more non-volatile memory elements using the second channel.

2. The memory system of claim 1, wherein the controller includes a buffer to store the data received from the circuit.

3. The memory system of claim 2, wherein the controller is operable to (i) read the first copy of the data stored in the first set of one or more non-volatile memory elements, (ii) read the second copy of the data stored in the second set of one or more non-volatile memory elements, (iii) determine if the read first copy or the read second copy is invalid based on a comparison with the data stored in the buffer, and (iv) re-write the data stored in the buffer of the controller into the first or second set of one or more non-volatile memory elements from where the invalid first or second copy was read.

4. The memory system of claim 3, wherein the controller is operable to re-write the data stored in the buffer of the controller into a selected location of the first or second set of one or more non-volatile memory elements, and wherein the selected location is a location from where the invalid first or second copy was read or a different location.

5. The memory system of claim 1, wherein, during a data request, the controller is operable to (i) read a first copy of the requested data from a first selected location of the first set of one or more non-volatile memory elements using the first channel, and to repair the first copy if it includes correctable errors, (ii) read a second copy of the requested data from a second selected location of the second set of one or more non-volatile memory elements using the second channel, and repair the second copy if it includes correctable errors, and (iii) provide an error-free copy of the requested data to the circuit.

6. The memory system of claim 5, wherein, if one of the first or second copies includes a block of data with uncorrectable errors, the controller is operable to replace the block of data that includes uncorrectable errors with a valid block of data from the other of the first or second copies, and to repair the first copy or the second copy to generate an error-free copy of the requested data.

7. A memory system comprising:

a host interface couplable to a host computer;

a first non-volatile memory subsystem coupled to a first channel, the first non-volatile memory subsystem including a first set of one or more non-volatile memory elements;

a second non-volatile memory subsystem coupled to a second channel, the second non-volatile memory subsystem including a second set of one or more non-volatile memory elements; and a controller coupled to the host interface by way of a data bus and an address and control (addr/cont) bus, the controller operable to receive data from and deliver data to the host computer via the data bus based on addr/cont signals received from the host computer via the addr/cont bus, the controller coupled to the first non-volatile memory subsystem by way of the first channel and to the second non-volatile memory subsystem by way of the second channel, wherein, in response to a data read request from the host computer, the controller is operable to:

(i) read a first copy of the requested data from a first selected location of the first set of one or more non-volatile memory elements through the first channel, determine if the first copy contains a correctable error, and generate an error-free first copy of the requested data by repairing the first copy of the requested data if it contains a correctable error, (ii) read a second copy of the requested data from a second selected location of the second set of one or more non-volatile memory elements through the second channel, determine if the second copy contains a correctable error, generate an error-free second copy of the requested data by repairing the second copy of the requested data if the second copy of the requested data contains a correctable error, and replace the second copy of the requested data with the error-free first copy of the requested data if the second copy of the requested data contains an uncorrectable error, and (iii) transmit to the host computer an error-free copy of the requested data corresponding to the first or second error-free copy.

8. The memory system of claim 7, wherein the controller is further operable to notify the host computer with an uncorrectable error message if at least one of the first or second copies of the requested data contains an uncorrectable error.

9. The memory system of claim 8, wherein the controller is further operable to deliver at least one of the first or second copies of the requested data containing an uncorrectable error to the host computer.

10. The memory system of claim 7, wherein said replacing the second copy of the requested data with the error-free first copy of the requested data if the second copy of the requested data contains uncorrectable errors includes writing the error-free first copy into a location of the second set of one or more non-volatile memory elements through the second channel.

11. The memory system of claim 10, wherein the location of the second set of one or more non-volatile memory elements is (a) a location from where the block of data with uncorrectable errors was read, or (b) a different location within the second set of one or more non-volatile memory elements.

12. The memory system of claim 11, wherein the location from where the second copy of the requested data was read is marked as bad block.

13. The memory system of claim 7, further comprising:
a volatile memory subsystem coupled to the controller, wherein the volatile memory subsystem is used to store at least one of the first or second error-free copies.

14. The memory system of claim 7, further comprising:
a volatile memory subsystem coupled to the controller, the volatile memory subsystem including first and second buffers, wherein (i) the first buffer is used to store one or more of the first copy of the requested data and the error-free first copy, and (ii) the second buffer is used to store one or more of the second copy of the requested data and the error-free second copy.

15. The memory system of claim 7, further comprising:
a voltage monitor circuit coupled to the controller, the voltage monitor circuit operable to (i) monitor a supply voltage provided by the host computer via the host interface and (ii) generate a control signal in response to a detected change in the monitored supply voltage, wherein the controller initiates a data read request in response to the control signal.

16. The memory system of claim 7, wherein the controller is further operable to notify the host computer with an uncorrectable error message if both the first and second copies of the requested data contain an uncorrectable error.

17. The memory system of claim 7, wherein the controller determines if the first or second copy contains a correctable error based on ECC (error-correcting code).

18. A memory system comprising:
a host interface couplable to a host computer;
a first non-volatile memory subsystem coupled to a first channel, the first non-volatile memory subsystem including a first set of one or more non-volatile memory elements;
a second non-volatile memory subsystem coupled to a second channel, the second non-volatile memory subsystem including a second set of one or more non-volatile memory elements;
a voltage monitor circuit couplable to the controller, the voltage monitor circuit operable to (i) monitor a supply voltage provided by the host computer via the host interface, and (ii) generate a control signal in response to a detected change in the monitored supply voltage;
a controller coupled to the host interface by way of a data bus and an address and control (addr/cont) bus, the controller operable to receive data from and deliver data to the host computer based on addr/cont signals received from the host computer, the controller coupled to the first non-volatile memory subsystem by way of the first channel and to the second non-volatile memory subsystem by way of the second channel, wherein the controller initiates a data read request in response to the control signal; and
a volatile memory subsystem coupled to the controller, wherein, in response to the data read request, the controller is operable to (i) read a first copy of the requested data from a first selected location of the first set of one or more non-volatile memory elements using the first channel, determine if the first copy contains correctable errors, and repair the first copy if it includes correctable errors, (ii) read a second copy of the requested data from a second selected location of the second set of one or more non-volatile memory elements using the second channel, determine if the second copy contains correctable errors, and repair the second copy if it includes correctable errors, and (iii) provide an error-free copy of the requested data, corresponding to the repaired first or second copy, to the volatile memory subsystem.

19. The memory system of claim 18, wherein the controller is further operable to (i) determine if one of the first or second copies includes a block of data with uncorrectable errors, (ii) replace the block of data with uncorrectable errors with a valid block of data from the other of the first or second copies, and (iii) repair the first copy or the second copy using the valid block.

20. The memory system of claim 18, wherein the controller includes a buffer to store one or more of 1) the first copy of the requested data, 2) the second copy of the requested data, 3) the repaired first copy, and 4) the repaired second copy.

21. The memory system of claim 18, wherein the voltage monitor circuit generates the control signal in response to sensing one or more of a low voltage condition, an imminent power interruption, a power failure, a power reduction, or when power is restored.

22. The memory system of claim 18, wherein the controller determines if the first or second copy contains a correctable error based on ECC (error-correcting code).

* * * * *